United States Patent [19]

Wetherald

[11] 4,263,820
[45] Apr. 28, 1981

[54] ENERGY EQUALIZING AND STORING DEVICE

[76] Inventor: Milo N. Wetherald, P.O. Box 1053, Port Angeles, Wash. 98362

[21] Appl. No.: 936,077

[22] Filed: Aug. 23, 1978

[51] Int. Cl.³ .............................................. G05G 1/14
[52] U.S. Cl. ................................ 74/594.2; 74/750 B; 185/10
[58] Field of Search .............. 74/750 B, 750 R, 594.2, 74/594.1; 185/10, 9

[56] References Cited

U.S. PATENT DOCUMENTS

| | | | |
|---|---|---|---|
| 551,867 | 12/1895 | Maggart et al. | 185/10 |
| 2,392,250 | 1/1946 | Lucas | 74/750 B |
| 2,459,871 | 1/1949 | Cole | 185/9 |
| 2,484,472 | 10/1949 | Simpson | 74/594.2 X |

Primary Examiner—Philip C. Kannan
Attorney, Agent, or Firm—Seed, Berry, Vernon & Baynham

[57] ABSTRACT

An apparatus for equalizing fluctuating torque and storing rotational energy received through a rotating input shaft. The input shaft is connected to a pair of circular drive plates rotatably mounted at opposite ends of an output drum. A plurality of drive shafts equally spaced from each other and the axis of the drum are rotatably mounted between circular end plates of the output drum. A pinion gear fixedly secured to one end of each drive shaft sequentially meshes with an arcuate rack carried by each of the drive plates. The lengths of the arcuate racks are sufficiently short so that the rack meshes with no more than two pinion gears at a time. As each of the drive shafts sequentially rotate, they wind a respective torsion spring which, in turn, rotates a second pinion gear. The second pinion gear meshes with a ring gear extending along the inside surface of the output drum. Ratchet mechanisms prevent unwinding of the torsion springs when the first pinion gears are not meshing with the racks. Thus, the input shaft sequentially winds each of several torsion springs while all of the torsion springs continuously apply a torque to the output drum. In another embodiment an annular sprocket is mounted on the outer surface of each drive plate to allow the drive plates to receive power through chains.

10 Claims, 6 Drawing Figures

ENERGY EQUALIZING AND STORING DEVICE

BACKGROUND OF THE INVENTION

1. Field of the Invention

This invention relates to transmission mechanisms, and more particularly to a transmission for equalizing and storing rotational energy.

2. Description of the Prior Art

Power transmission devices are commonly used to convey rotational motion from a power generating device to a power utilizing device. Often the power supplied by the power generating device fluctuates to some extent. Similarly, the power demanded by the power utilization device may also fluctuate in a manner unrelated to the fluctuations of the power from the power supply device. Under these circumstances it is desirable for the energy produced by the power generating device to be stored so that it is available upon demand from the power utilization device. In this manner, the power generating device can produce a widely fluctuating output while the output of the transmission mechanism is either substantially constant or fluctuating in an unrelated manner.

One familiar situation where both the power supplied and power demand fluctuates widely is in a conventional bicycle. When the pedals of the bicycle are at the top and bottom of each cycle the power produced is relatively minimal, while the power produced during the mid-portion of each cycle is substantially greater. Similarly, the power utilized by the bicycle fluctuates responsive to varying road conditions, gradiants and bicycle speeds. Thus, it is desirable to allow the operator of a bicycle to supply power at a rate independently of the power demand, and to store energy when the power supplied exceeds the power required so that it is available upon demand.

SUMMARY OF THE INVENTION

It is an object of the invention to provide a mechanism for storing energy received through a rotating shaft.

It is another object of the invention to provide a mechanism for equalizing torque transmitted from an input shaft to an output drum.

It is still another object of the invention to provide a power transmission device of the character described capable of generating an output torque larger than the input torque.

These and other objects of the invention are accomplished by sequentially coupling an input member of the apparatus to a plurality of torsion members while applying all of the torsion members simultaneously to an output member of the apparatus. Thus, rotational energy is stored in the apparatus as it is produced and it may be transferred from the apparatus as required. Since only a portion of the torsion members are connected to the input member, whereas all of the torsion members are connected to the output member, the ratio of the output torque to the input torque is approximately equal to the ratio between the number of torsion members simultaneously connected to the output member and the number of torsion members connected to the input shaft at any one time. The apparatus is particularly useful in any application where the available torque from a power generating device varies or where the power demanded by a power consuming device varies.

DETAILED DESCRIPTION OF THE INVENTION

Figure 1:
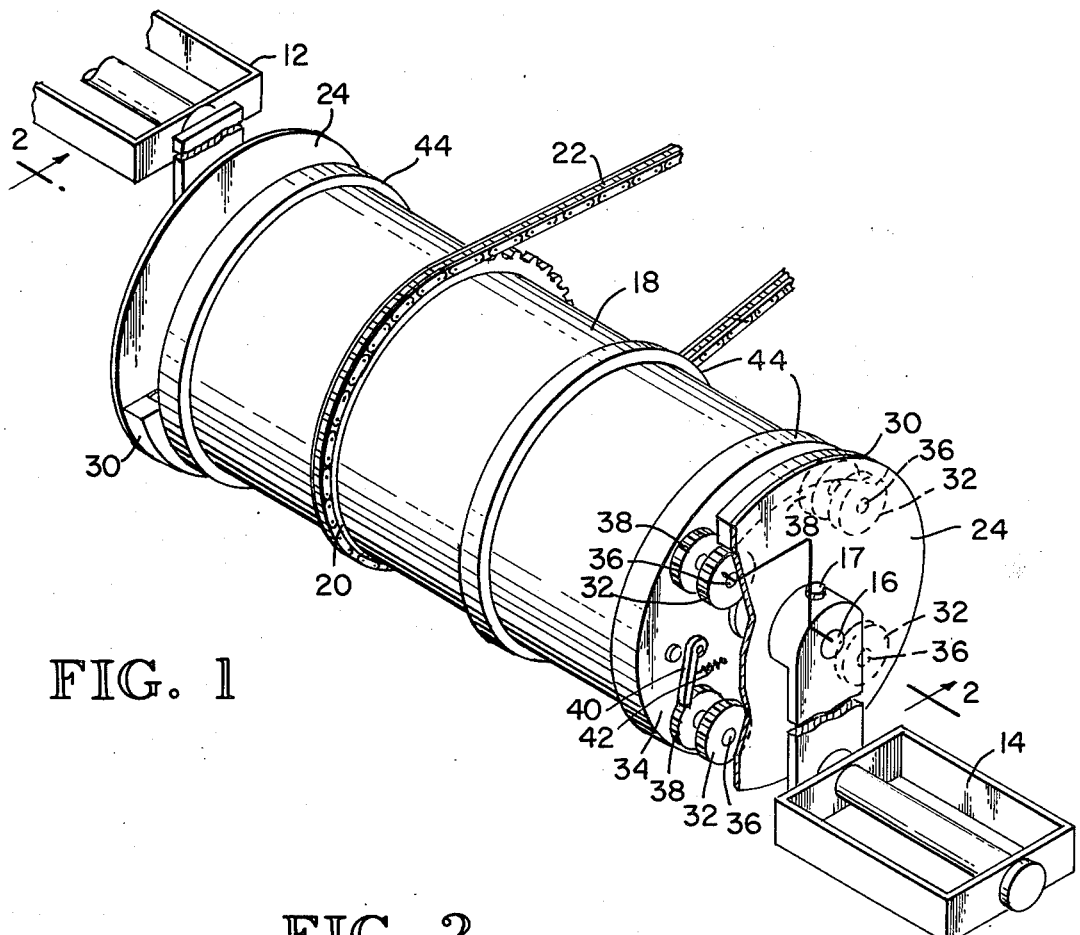
FIG. 1 is an isometric view, partially broken away, of the inventive torque equalizing and energy storage apparatus.
Figure 3:
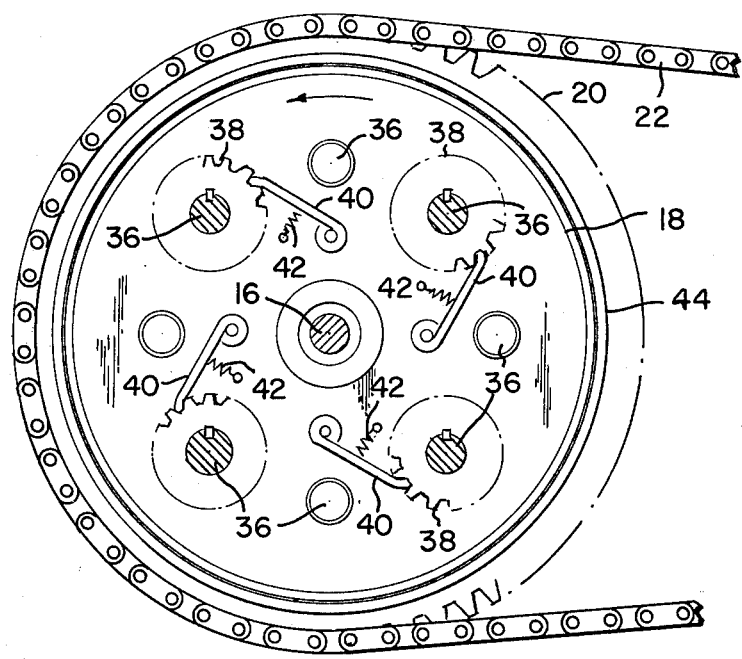
FIG. 3 is a cross-sectional view taken along the line 3—3 of FIG. 2.

The external features of one embodiment of the apparatus for equalizing torque and storing rotational energy are best illustrated in FIG. 1. The apparatus receives power from a rider through a pair of oppositely phased pedals 12, 14 which are mounted on a common input shaft 16 by a bolt 17. The shaft 16 is rotatably mounted as described hereinafter along the axis of a cylindrical output drum 18 having a conventional sprocket 20 extending circumferentially around its outer perimeter. A conventional chain 22 engages the sprocket 20 to transmit rotation of the output drum 18 to a bicycle wheel sprocket (not shown). A pair of circular drive plates 24 are secured to the input shaft 16. An arcuate rack 30 is mounted on the inside face of each drive plate 24. The racks 30 have a series of equally spaced teeth integrally formed therein which mesh with the teeth of a plurality of circumferentially spaced pinion gears 32 projecting through end walls 34 of the output drum 18. The pinion gears 32 are mounted on respective drive shafts 36 along with a ratchet wheel 38 as best illustrated in FIG. 3. A pawl member 40 is resiliently biased against each ratchet wheel 38 by a respective tension spring 42 in order to prevent the ratchet wheel 38 from rotating clockwise as illustrated in FIG. 1. The output drum 18 is rotatably mounted on a bicycle through a pair of annular bearing rings 44 having an inner race fixedly secured to the drum 18, an outer race removably secured to the bicycle and a plurality of circumferentially spaced apart bearings between the races.

In operation, the pedals 12, 14, and hence the input shaft and drive plates 24, are rotated clockwise as illustrated in FIG. 1 by the bicycle rider. The arcuate rack 30 then sequentially rotates each of the pinion gears 32 which, as explained hereinafter, convey energy to internal energy storage members. Finally, the energy storage members drive the output drum 18 in a clockwise direction. Thus energy may be transferred to the inventive apparatus as rapidly as desired regardless of the magnitude of power currently required by the rear wheel sprocket, and the power may be transferred to the rear wheel sprocket as required regardless of the magnitude of the power currently being provided by the rider.

Figure 2:
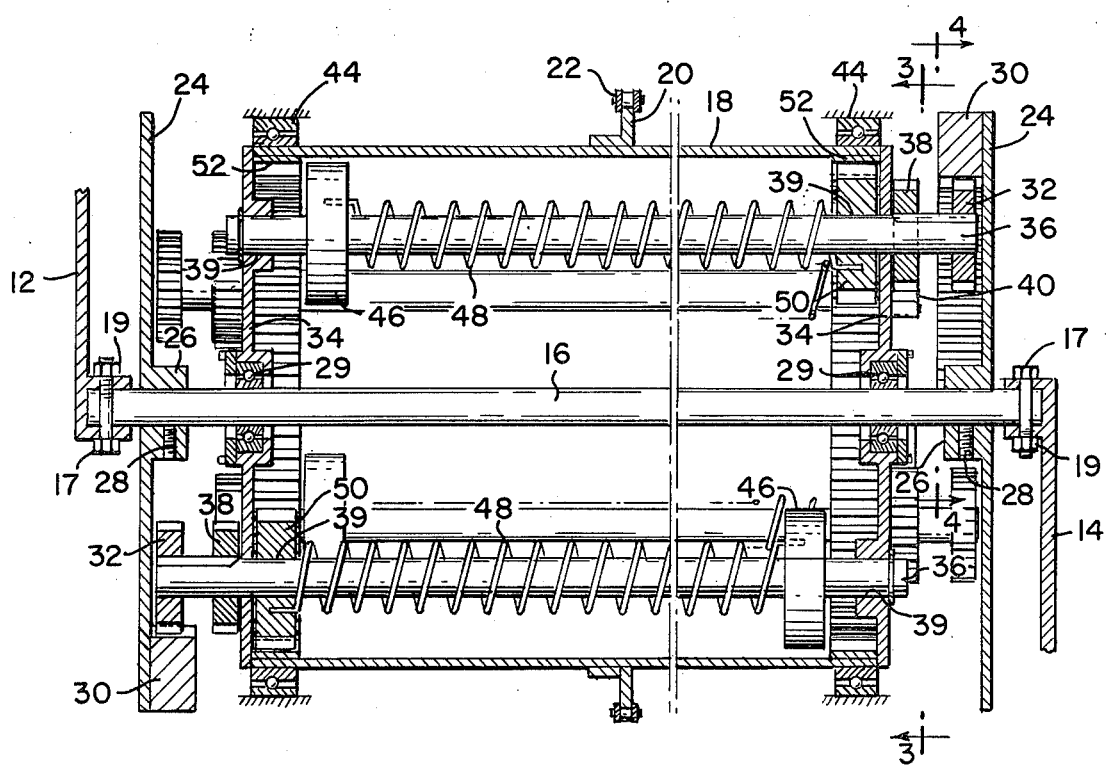
FIG. 2 is a cross-sectional view taken along the line 2—2 of FIG. 1.

The internal features of the torque equalizing and energy storage apparatus are illustrated in the remaining figures with particular reference to FIG. 2. The drive plate 24 has integrally formed therewith a cylindrical hub 26 containing a set-screw 28 which secures the plate 24 to the input shaft 16. The bolt 17 securing the pedal 14 to the shaft 16 engages a nut 19. The input shaft 16 is rotatably mounted along the axis of the output drum 18 by conventional bearings 29. The drive shafts 36 rotated by the pinion gears 32 are rotatably mounted between the end walls 34 of the output drum 18 by journal bearings 39. Adjacent drive shafts 36 have one of their ends projecting through opposite end walls 34 of the output drum 18. The end of each drive shaft 36 opposite the projecting end has formed therein a cylindrical step 46 fixedly receiving the end of a torsion member such as a torsion spring 48. Other torsion members, such as elongated, resilient rods, may also be used. The opposite end of the torsion spring 48 is anchored to a second pinion gear 50 which is rotatably mounted on the drive shaft 36. The pinion gears 50 mesh with respective ring gears 52 extending circumferentially about the inner periphery of the output drum 18 at opposite ends thereof.

In operation, the torsion springs 48 are sequentially wound as the arcuate rack sequentially engages pinion gears 32. Since the drive shafts 36 are prevented from rotating in a spring unwinding direction by the ratchet wheels 38 and pawls 40, the spring 48 may only be unwound by rotation of the pinion gear 50 which rotates the output drum 18 through ring gear 52.

Figure 4:
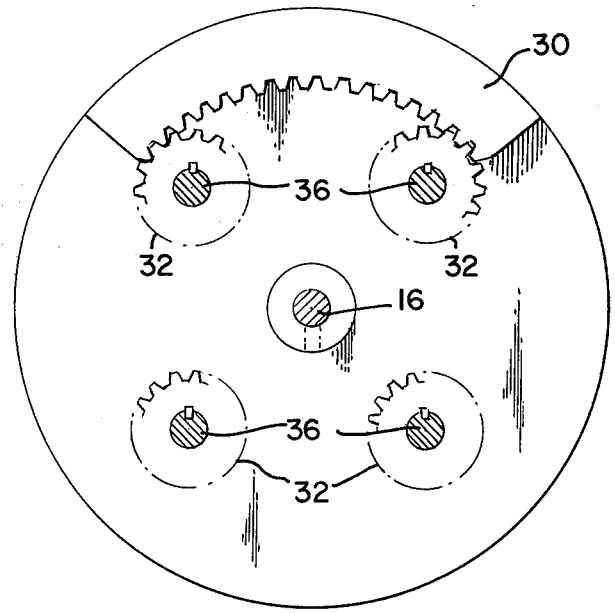
FIG. 4 is a cross-sectional view taken along the line 4—4 of FIG. 2.

As best illustrated in FIG. 4, the length of the arcuate rack 30 is sufficient to simulataneously engage only two pinion gears 32 at each end of the drum 18. However, all of the pinion gears 50 simultaneously engage the ring gears 52. Thus the torque imparted to the pedals 12, 14 is transmitted to either one or two torsional springs 48 on each side of the drum 18 at any one time, but all of the torsional springs 48 are simultaneously coupled to the output drum 18. Consequently, the ratio of the torque imparted to the output drum 18 to the torque received by the input shaft 16 through the pedals 12, 14 is approximately equal to the ratio of the total number of torsion springs 48 to the number of torsion springs 48 simultaneously driven by the arcuate rack 30. This number, of course, is always greater than one. Energy may be stored in the apparatus by sequentially winding the springs 48 regardless of the rate of energy demand from the output drum 18. For example, the springs 48 can be wound even when the output drum 18 is stationary. Similarly, stored energy is available upon demand so that the magnitude of the power transmitted by the output drum 18 may exceed the current rate which energy is being supplied to the input shaft 16.

Figure 5:
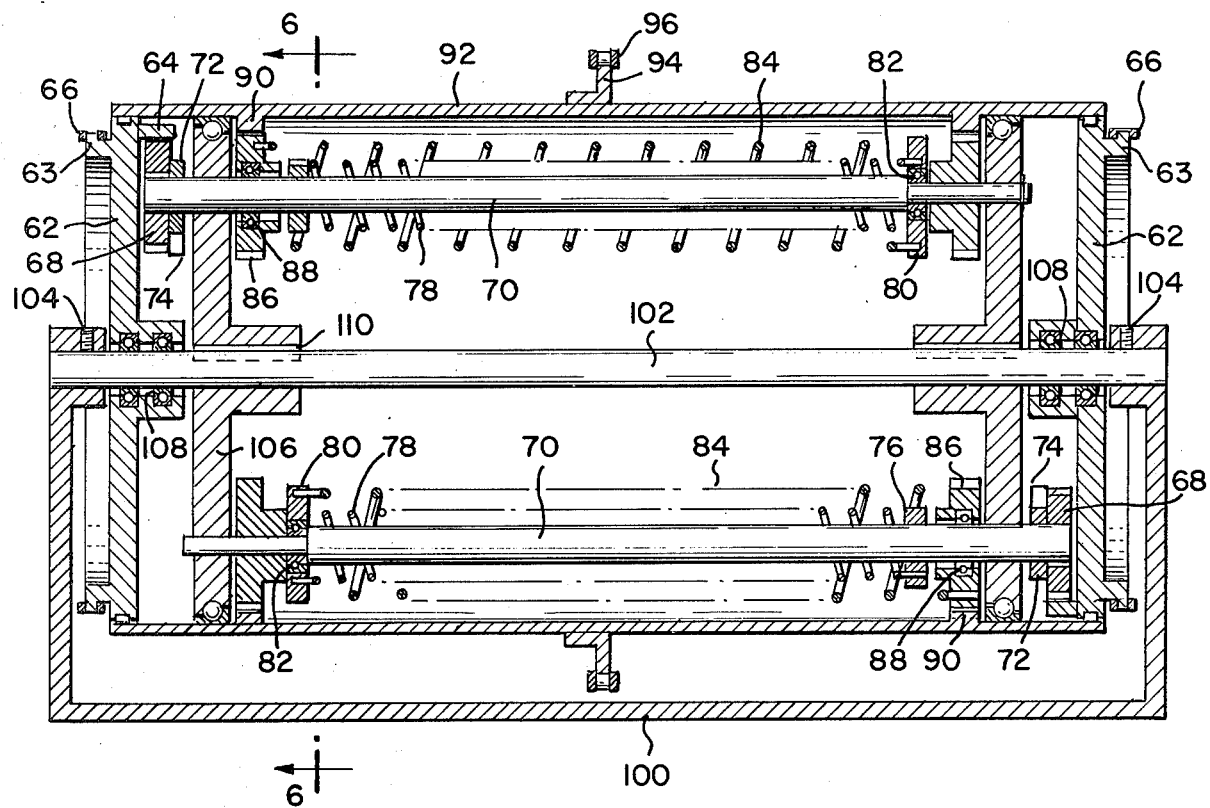
FIG. 5 is a cross-sectional view of another embodiment of the torque equalizing and energy storage apparatus.
Figure 6:
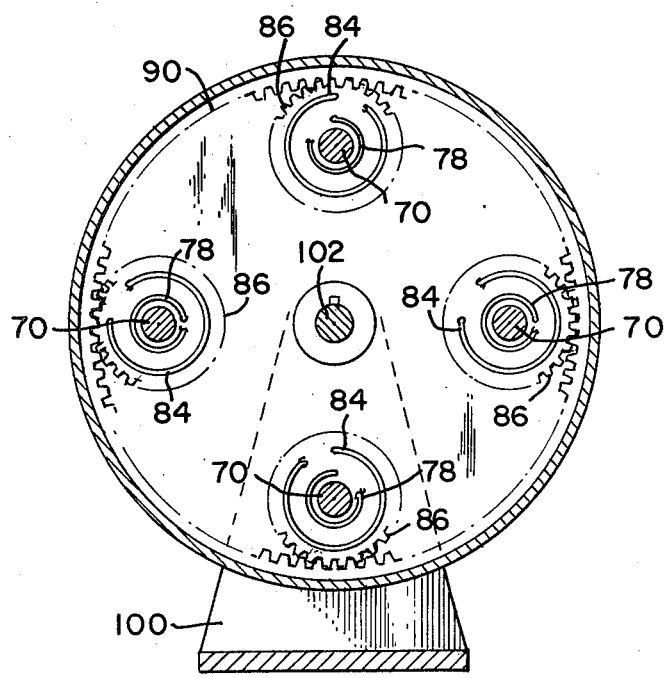
FIG. 6 is a cross-sectional view taken along the line 6—6 of FIG. 5.

Another embodiment of the inventive energy equalizing and storing device is illustrated in FIGS. 5 and 6. This second embodiment is substantially identical to the first embodiment except that power is received by the device in a different manner and it is mounted utilizing a different support structure. Specifically, the apparatus includes a pair of drive plates 62 having an arcuate rack 64 mounted on its center surface. An annual sprocket 63 is secured to the outer face of the drive plate 62. The sprockets 64 each mesh with a chain 66 which engage a conventional power generating device (not shown) such as a motor or pedal.

The arcuate racks 64 engage respective pinion gears 68 which are rigidly secured to respective drive shafts 70 along with ratchet wheels 72. The ratchet wheels 72 receive respective pawls similar to the pawls 40 of FIG. 3 which allow the ratchet wheels 72, and hence the shaft 70, to rotate in one direction but prevent rotations of the shafts 70 in the opposite direction.

The shafts 70 each carry a collar 76 which rotates with the shafts 70 and drive respective torsion springs 78. The opposite ends of the torsion springs 78 terminate in an annual ring 80 which is rotatably mounted on the shaft 70 by bearings 82 and drive a second torsion spring 84. The second torsion spring 84 being of larger diameter than the first torsion spring 78, extends around the first torsion spring 78 and terminates in respective pinion gears 86 which are rotatably mounted on the shaft 70 through bearings 88. The pinion gears 86 mesh with respective ring gears 90, extending around the inside surface of an output drum 92 which carries an output sprocket 94. An output chain 96 engages the sprockets 94 to transfer power to a conventional power consuming device (not shown).

The second embodiment of the energy equalizing and storing device is supported by a generally U-shaped bracket 100 having its ends connected to a support shaft 102 by set screws 104. The support shaft 102 extends through the drive plates 62 and a pair of drive shaft support plates 106 and is connected thereto through bearings 108, 110.

The second embodiment of the energy equalizing and storing device functions in substantially the same manner as does the first embodiment. The drive plates 62 are rotated by the chains 66 through sprocket 64 thereby causing the arcuate rack 64 to sequentially engage the pinion gear 68. As the pinion gears sequentially rotate thereby rotating respective drive shafts 70, the torsion springs 78, 84 are wound. Since the ratchet wheel 72 and pawl 74 prevent rotation of the shaft 70 in the reverse direction, the springs 78, 84 can unwind only by rotating pinion gear 86 which rotates the output drum 92 through ring gear 90. Rotation of the output drum 92 is coupled to a power consuming device through the chain 96 and sprocket 94.

I claim:
1. An apparatus for equalizing torque and storing rotational energy received from a rotating input member and transferred to a rotatable output member, comprising:
   a plurality of torsion members having first and second ends;
   first transmission means secured to the first end of each torsion member for transmitting rotation from said input member to the first ends of said torsion members in sequence so that only a portion of said torsion members are simultaneously driven by said input member;
   ratchet means for preventing said torsion members from unwinding when said first transmission means disconnects said input member from the first ends of said torsion members; and
   second transmission means secured to second end of each torsion member for continuously transmitting rotation of said second end to said output member, whereby energy received through said input member is stored by said torsion members in sequence while energy stored by said torsion members is continuously transmitted to said output member, and the ratio of the output torque to the input torque is approximately equal to the ratio of the total number of torsion members to the number of torsion members simultaneously driven by said input member.

2. The apparatus of claim 1 wherein said output member includes a cylindrical output drum and wherein said second transmission means includes a ring gear extending along an inside surface of said output drum and a first pinion gear meshing with said ring gear and secured to the second end of each torsion member such that rotation of said pinion gear as said torsion member unwinds causes said output drum to revolve.

3. The apparatus of claim 2 wherein said torsion members include an elongated torsion spring having one of its ends terminating in one of said first pinion gears and the other of its ends connected to said first transmission means such that the torque applied to said ring gear is approximately equal to the sum of the torques of said torsion springs.

4. The apparatus of claim 2 wherein said torsion members include a pair of concentrically wound torsion springs having one set of adjacent ends secured to each other with the free end of one spring connected to said first transmission means and the free end of the other spring terminating in one of said first pinion gears.

5. The apparatus of claim 2 wherein said input member includes a circular drive plate rotatably secured to said output drum about the axis of said drum, and wherein said first transmission means includes a second pinion gear secured to the first end of each torsion member, and an arcuate rack secured to the inside face of said drive plate, said rack having a length insufficient to simultaneously mesh with all of said second pinion gears such that rotation of said drive plate simultaneously rotates less than all of said second pinion gears.

6. The apparatus of claim 5 wherein the arcuate length of said rack is less than twice the circumferential distance between said second pinion gears such that no more than two of said second pinion gears are simultaneously rotated.

7. The apparatus of claim 5 further including support means for mounting said apparatus comprising a support shaft extending along the axis of said output drum with said drive plate and output drum rotatably secured to said support shaft through bearings and a generally U-shaped support bracket straddling said output drum with its ends connected to respective ends of said support shaft.

8. The apparatus of claim 1 wherein said input member includes a rotatably mounted, circular drive plate, and wherein said first transmission means includes a second pinion gear secured to the first end of each torsion member, and an arcuate rack secured to the inside face of said drive plate, said rack having an arcuate length insufficient to simultaneously mesh with all of said second pinion gears such that rotation of said drive plate simultaneously rotates less than all of said second pinion gears.

9. A transmission for equalizing torque and storing rotational energy, comprising:
a cylindrical output drum having an output sprocket extending circumferentially about its outer periphery and a pair of ring gears extending circumferentially about the inner periphery of said drum at opposite ends thereof;
a pair of circular drive plates adapted to rotate about the rotational axis of said output drum adjacent the ends thereof;
a plurality of elongated torsion springs circumferentially spaced apart from each other within said output drum an equal distance from each other and the axis of said output drum;
a plurality of drive shafts rotatably mounted in said output drum coaxially with said torsion springs, said shafts having one of their ends secured to the free end of a respective torsion spring adjacent one end wall of said output drum and their other ends projecting through the opposite end wall of said output drum;
a first pinion gear fixedly mounted on the projecting end of each drive shaft;
a second pinion gear rotatably mounted on each drive shaft and meshing with one of said ring gears, said pinion gear being secured to the free end of said torsion spring such that unwinding of said torsion spring rotates said output drum through said second pinion gear;
an arcuate rack secured to the inside face of each drive plate adapted to mesh with said first pinion gears, said rack having a circumferential length insufficient to simultaneously mesh with all of said pinion gears; and
ratchet means for preventing rotation of said first pinion gears in a torsion relieving direction such that energy received by said drive plates is stored in said torsion springs in sequence while energy stored in said torsion springs is continuously transmitted to said output drum, and the ratio of the output torque to the input torque is approximately equal to the ratio of the total number of torsion springs to the number of torsion springs simultaneously driven by said arcuate rack through said first pinion gears and drive shafts.

10. The transmission of claim 9 further including an annular sprocket secured to the outer face of each drive plate and a support shaft rotatably mounted within said output drum and extending along the axis thereof, said support shaft being rotatably secured to said drive plates; and a generally U-shaped support bracket straddling said output drum and having its ends secured to the ends of said support shaft.

* * * * *